(12) United States Patent
Hähre et al.

(10) Patent No.: US 11,376,983 B2
(45) Date of Patent: Jul. 5, 2022

(54) TRACTION BATTERY CHARGING STATION

(71) Applicant: Dr. Ing. h.c. F. Porsche Aktiengesellschaft, Stuttgart (DE)

(72) Inventors: Karsten Hähre, Dudenhofen (DE); Marija Jankovic, Stuttgart (DE); Christoph Roggendorf, Markgröningen (DE)

(73) Assignee: Dr. Ing. h.c. F. Porsche Aktiengesellschaft

( * ) Notice: Subject to any disclaimer, the term of this patent is extended or adjusted under 35 U.S.C. 154(b) by 86 days.

(21) Appl. No.: 17/094,972

(22) Filed: Nov. 11, 2020

(65) Prior Publication Data

US 2021/0138923 A1 May 13, 2021

(30) Foreign Application Priority Data

Nov. 12, 2019 (DE) ...................... 10 2019 130 421.0

(51) Int. Cl.
*B60L 53/62* (2019.01)
*B60L 53/30* (2019.01)

(52) U.S. Cl.
CPC ............. *B60L 53/62* (2019.02); *B60L 53/305* (2019.02); *B60L 2240/547* (2013.01)

(58) Field of Classification Search
CPC .. B60L 53/62; B60L 53/305; B60L 2240/547; B60L 3/0069; B60L 53/11; B60L 53/60; B60L 53/31; Y02T 10/70; Y02T 10/7072; Y02T 90/12; Y02T 90/14; Y02T 90/16; H02J 7/0029; G01R 31/40

USPC .................................................. 320/104, 109
See application file for complete search history.

(56) References Cited

U.S. PATENT DOCUMENTS

| 10,131,239 B2 | 11/2018 | Herke et al. |
| 2011/0273139 A1* | 11/2011 | Hofheinz ................ B60L 55/00 320/109 |
| 2018/0056803 A1 | 3/2018 | Hell |

FOREIGN PATENT DOCUMENTS

| DE | 102015107161 A1 | 11/2016 |
| DE | 102015110023 A1 | 12/2016 |

* cited by examiner

*Primary Examiner* — Paul Dinh

(74) *Attorney, Agent, or Firm* — RatnerPrestia

(57) ABSTRACT

A traction battery charging station for charging a traction battery of a motor vehicle having an electric traction motor. The charging station includes a converter that feeds DC voltage into a pair of two charging lines during charging operation, a charging controller, and an insulation monitor having two measuring resistors that are each connected to a charging line and are able to be connected to protective earth via a respective resistor switch. The insulation monitor monitors the electrical insulation of the pair of charging lines with respect to protective earth during non-charging and during charging of the traction battery. A test mode controller has a non-restricted non-charging test mode in which one resistor switch is closed and the other resistor switch is open at the same time, and a symmetric charging test mode in which both resistor switches are closed at the same time or open at the same time.

4 Claims, 2 Drawing Sheets

TRACTION BATTERY CHARGING STATION

CROSS-REFERENCE TO RELATED APPLICATION

Figure 1:
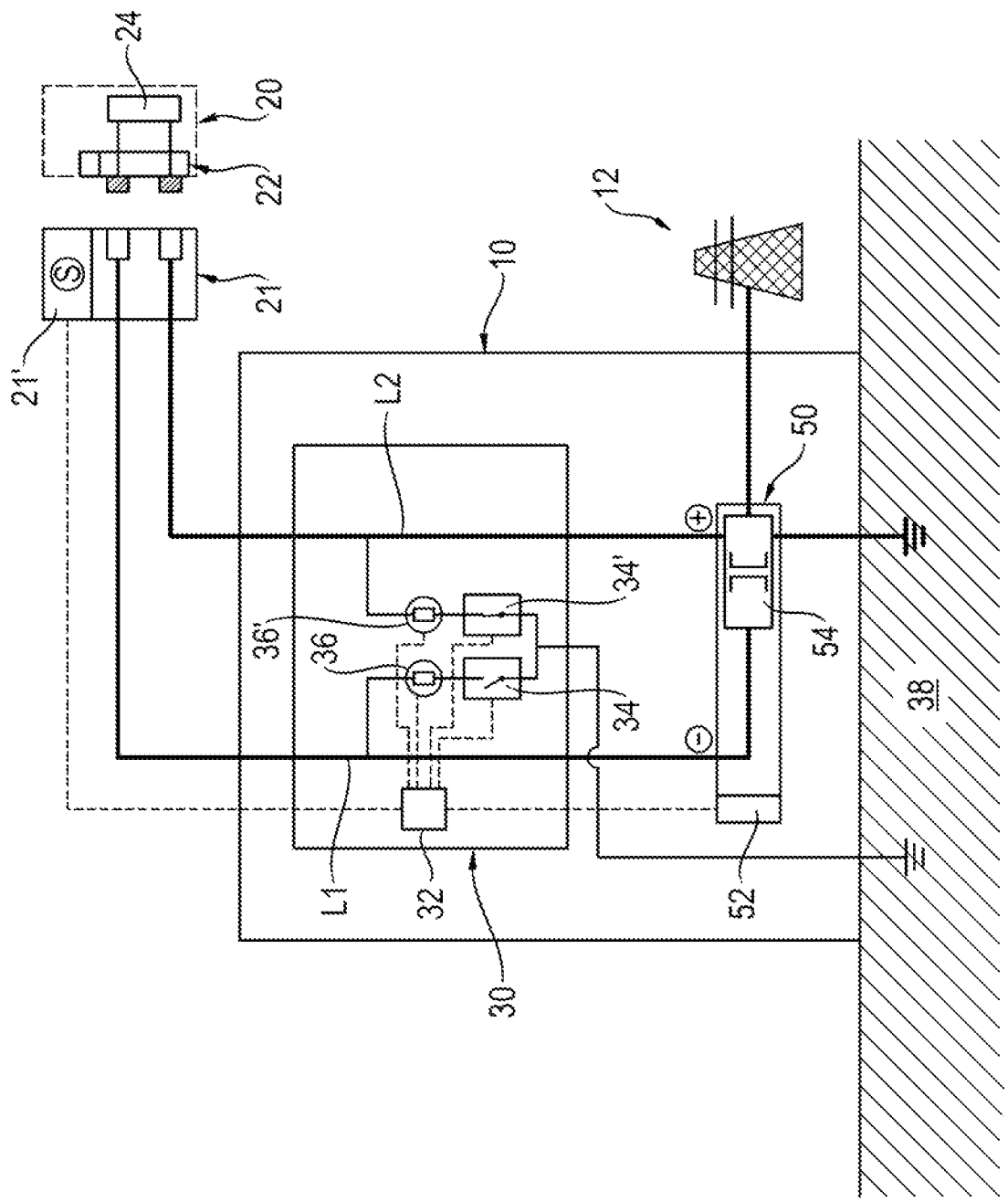

This application claims priority to German Patent Application No. 10 2019 130 421.0, filed Nov. 12, 2019, the content of such application being incorporated by reference herein in its entirety.

FIELD OF THE INVENTION

The invention relates to a traction battery charging station for charging a motor vehicle traction battery with DC current.

BACKGROUND OF THE INVENTION

The traction battery charging station has a power/voltage converter that provides an electrical charging DC voltage during charging operation and feeds into a pair of two DC current charging lines. The charging station has a charging controller that monitors, controls and regulates the charging procedure and preparation thereof. For safety reasons, traction battery charging stations require an electrical insulation monitoring system that electrically monitors the electrical insulation or the electrical resistance between the charging lines, on the one hand, and protective earth, on the other hand. Such charging stations are known for example from DE 10 2015 107 161 A1 and DE 10 2015 110 023 A1, which are each incorporated by reference herein.

SUMMARY OF THE INVENTION

A typical insulation monitoring system for a charging station consists of an insulation monitor having two electrical measuring resistors or circuits that are each connected to a charging line and are able to be connected to protective earth via a resistor switch. When the resistor switch is closed, the insulation resistance of the charging line in question is able to be determined highly accurately, for example using a resistor bridge of which the measuring resistor forms part. Legal safety requirements stipulate both detection of what are known as symmetric insulation faults, which are caused for example by ageing of insulation materials, and detection of what are known as non-symmetric insulation faults, which are caused by acute damage.

Non-symmetric insulation faults may be identified using a symmetric test mode in which both resistor switches are closed at the same time, such that the insulation resistance of both charging lines of a pair of charging lines is able to be determined individually. Symmetric insulation faults are however not able to be identified here. Symmetric insulation faults are identified using a non-symmetric test mode in which the resistor switches are each closed or opened only alternately, and the two charging lines are thus each measured only individually with regard to their insulation resistance.

Both charging lines are typically checked constantly and alternately in the symmetric and the non-symmetric test mode both before the actual charging procedure and during the charging procedure. However, the electrical robustness of the charging station and of the motor vehicle in question is restricted during charging operation by the non-symmetric test mode. Under some usage conditions, there may in this case be faults that may in particular interfere with the communication between the charging station and the connected motor vehicle.

It would therefore be desirable to provide a traction battery charging station having an insulation monitor by way of which electrical faults between the charging station and the motor vehicle are avoided.

The traction battery charging station according to aspects of the invention is intended to charge a traction battery of a motor vehicle equipped with an electric traction drive. The charging station has a power/voltage converter that feeds an electrical DC voltage charging power into a pair of two DC current charging lines during charging operation. The two charging lines are also referred to as positive charging line and as negative charging line and are part of a closed and electrically unearthed charging circuit that is galvanically isolated from protective earth.

The charging station has an insulation monitor having two ohmic measuring resistors that are each connected to a charging line and are each able to be connected, at their other side, to protective earth via a switchable resistor switch. When the resistor switch is closed, the ohmic insulation resistance of the charging line in question with respect to electrical protective earth may be determined with regard to the connected charging line, for example using a resistor bridge.

According to aspects of the invention, there is provision for the insulation monitor to have a test mode controller that has stored and is able to control a non-symmetric non-charging test mode in which one resistor switch is closed and the other resistor switch is open at the same time, or vice versa, and a symmetric charging test mode in which both resistor switches are either closed or open at the same time. This ensures that a non-symmetric test mode is not activated during a charging procedure.

The insulation monitor ascertains, from another control element of the charging station, whether a charging procedure is active or whether the motor vehicle is electrically connected to the charging station. If the insulation monitor receives a report of an active charging procedure or, alternatively or in addition, receives a report of an electrical connection between the motor vehicle and the charging station, the insulation monitor switches to the charging test mode in which only symmetric insulation measurement takes place or is able to take place.

Before any charging procedure, the insulation monitor mandatorily performs a complete insulation test, both in the non-symmetric test mode and in the symmetric test mode. This may take place for example by way of what is known as a bus shifting method. The insulation state of the two charging lines as far as the charging plug of the charging station is thereby ascertained. As soon as the charging procedure begins, the test mode controller switches to the charging test mode in which only the symmetrical test mode is performed. Although in particular no ageing-induced and systematic worsening in the electrical insulation of the charging lines with respect to protective earth is identified in the symmetric test mode, a spread-apart, for example daily check is naturally completely sufficient for this purpose. Dispensing with the non-symmetric test mode during the charging procedure therefore does not constitute any significant impairment for the insulation safety monitoring.

The test mode controller preferably activates only the charging test mode during the charging operation reported to the insulation monitor by the charging controller.

As an alternative or in addition thereto, the charging station-side charging plug into which the pair of charging lines opens may have a connection sensor that detects connection of the charging plug to a vehicle-side charging socket. The test mode controller is informally connected to the connection sensor. The test mode controller activates the charging test mode when connection is reported by the connection sensor. This ensures that the insulation monitor only still operates in the charging test mode as soon as the charging station is electrically connected to the motor vehicle in question.

In accordance with the method according to aspects of the invention for controlling the insulation monitor of the traction battery charging station, the following method steps are provided:

When a request for charging operation is received and before the start of the charging operation, the non-charging test mode is activated, such that the two resistor switches are opened and closed multiple times in a manner complementary to one another. As soon as the non-charging test mode is completed with a positive result, the actual charging operation may be started. As soon as the charging operation is started and for as long as the charging operation continues, the test mode controller activates the charging test mode in which both resistor switches are always either closed at the same time or open at the same time.

The insulation monitor may furthermore be designed such that it regularly performs a self-test, specifically both before connection and during connection of the charging station-side charging plug to a vehicle-side charging socket.

BRIEF DESCRIPTION OF THE DRAWING FIGURES

Figure 2:
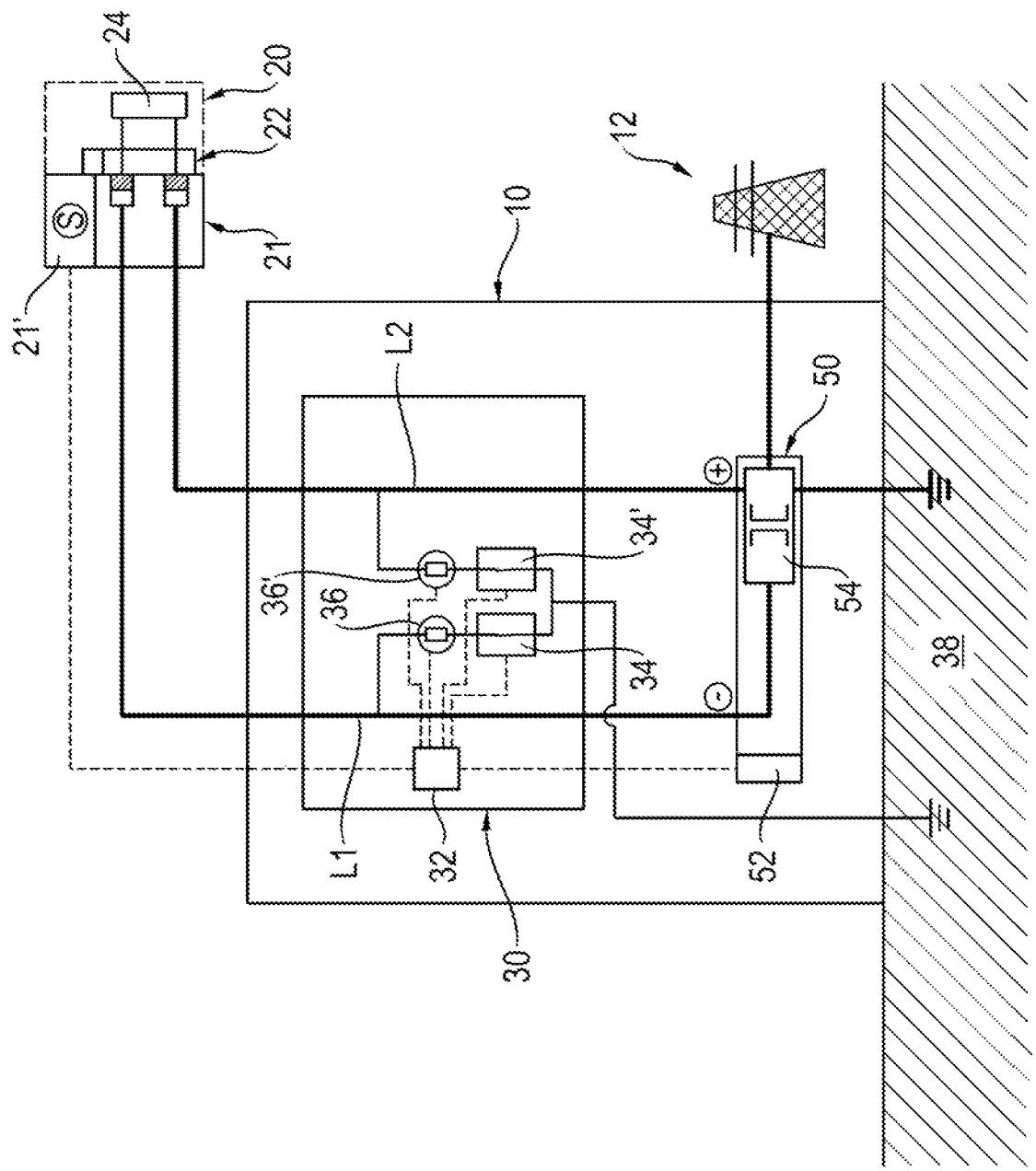

An exemplary embodiment of the invention is explained in more detail in the following text with reference to the drawings, in which:

FIG. 1 schematically shows a traction battery charging station having an insulation monitor and an integrated test mode controller in the non-charging test mode, and a non-connected motor vehicle, and FIG. 2 shows the arrangement from FIG. 1 with the connected motor vehicle and the test mode controller in the charging test mode.

DETAILED DESCRIPTION OF THE INVENTION

FIGS. 1 and 2 each schematically illustrate an arrangement consisting of a traction battery charging station 10 and a motor vehicle 20 having a traction battery 24 and an electric traction motor.

The charging station 10 has a power/voltage converter 50 that is supplied with AC voltage from a public electrical energy grid 12 and that has galvanic isolation 54. The power/voltage converter 50 feeds electrical high-voltage DC current charging power to a pair of two charging lines L1, L2. The charging station 10 furthermore has an electronic charging controller 52 that monitors all of the processes of the charging station 10, and in particular monitors and controls the charging process and preparation thereof. The two charging lines L1, L2 open into a charging station-side charging plug 21 that is able to be coupled to a corresponding vehicle-side charging socket 22, as illustrated in FIG. 2. The charging plug 21 has a connection sensor 21' that detects connection of the charging plug 21 to the charging socket 22.

When the charging plug 21 is coupled to the charging socket 22, the traction battery 24 of the motor vehicle 20 is able to be charged via the two charging lines L1, L2.

The charging station 10 furthermore has an insulation monitor 30 through which the two charging lines L1, L2 are routed. In the insulation monitor 30, each charging line L1, L2 is assigned a respective measuring resistor 36, 36' and a resistor switch 34, 34' connected in series with the measuring resistor 36, 36'. When the resistor switch 34' is closed, the charging line L2 in question is electrically connected to protective earth 38 via the measuring resistor 36' in question. The measuring resistor 36, 36' may be designed as part of a resistor bridge, the detuning of which is ascertained in order thereby to exactly determine the electrical insulation resistance of the charging line L1, L2 in question with respect to protective earth 38.

The insulation monitor 30 has a test mode controller 32 that is electrically or informally connected to the measuring resistors 36, 36', the resistor switches 34, 34', the charging controller 52 and the connection sensor 21'. The test mode controller 32 has stored inter alia two test modes, specifically a non-symmetric non-charging test mode in which a respective one of the two resistor switches 34' is closed and the other resistor switch 34 is open, or vice versa, and a symmetric charging test mode in which both resistor switches 34, 34' are always closed at the same time or open at the same time.

As soon as the charging controller 52 registers a charging request, this is also registered by the test mode controller 32, which then starts the non-charging test mode, and in this case performs both a symmetric test and a non-symmetric test of the insulation resistance of the two charging lines L1, L2. The test mode controller 32 in particular performs the non-symmetric test in which the two resistor switches 34, 34' are closed and opened multiple times in a manner complementary to one another in what is known as a bus shifting method, as illustrated in FIG. 1. Symmetric faults or symmetric changes in the insulation resistance of the two charging lines L1, L2 are in particular thereby detected.

As soon as the charging controller 52 signals the beginning of the charging operation or the connection sensor 21' reports the mechanical and electrical connection of the charging plug 21 to the vehicle-side charging socket 22, the test mode controller 32 switches to the charging test mode, in which only a symmetric test of the insulation resistances of the two charging lines L1, L2 is performed, as illustrated in FIG. 2. For as long as the charging operation continues or the charging station 10 and the motor vehicle 20 are electrically connected to one another, the test mode controller 32 does not deactivate the charging test mode, such that a non-symmetric measurement of the insulation resistance of the charging lines L1, L2 is not performed during the charging operation or during the exchange of information between the motor vehicle 20 and the charging station 10.

What is claimed:

1. A traction battery charging station for charging a traction battery of a motor vehicle having an electric traction motor, said traction battery charging station comprising:
   a power/voltage converter that is configured to feed an electrical DC voltage charging power into a pair of two charging lines during a charging operation;
   a charging controller; and
   an insulation monitor having two electrical measuring resistors that are each connected to a respective one of the two charging lines and are each configured to be connected to protective earth via a respective resistor switch, wherein the insulation monitor is configured to monitor the electrical insulation of the pair of charging lines with respect to the protective earth during non-charging and during charging of the traction battery, wherein the insulation monitor has a test mode controller,
wherein, when the vehicle is electrically connected to the charging station via the two charging lines and the charging station is not charging the vehicle, the test mode controller is configured to perform:
  (i) a non-symmetric non-restricted non-charging test mode in which one of the resistor switches is closed and the other resistor switch is open at the same time, and
  (ii) a symmetric charging test mode in which both of the resistor switches are either closed at the same time or open at the same time,
wherein, when the vehicle is electrically connected to the charging station via the two charging lines and the charging station is charging the vehicle, the test mode controller is configured to perform the symmetric charging test mode without performing the non-symmetric non-restricted non-charging test mode.

2. The traction battery charging station as claimed in claim 1, wherein the test mode controller activates only the charging test mode during the charging operation reported to the insulation monitor by the charging controller.

3. A traction battery charging station for charging a traction battery of a motor vehicle having an electric traction motor, said traction battery charging station comprising:
  a power/voltage converter that is configured to feed an electrical DC voltage charging power into a pair of two charging lines during a charging operation;
  a charging controller; and
  an insulation monitor having two electrical measuring resistors that are each connected to a charging line and are configured to be connected to protective earth via a respective resistor switch, wherein the insulation monitor is configured to monitor the electrical insulation of the pair of charging lines with respect to the protective earth during non-charging and during charging of the traction battery,
  wherein the insulation monitor has a test mode controller that has stored and is configured to control a non-restricted non-charging test mode in which one of the resistor switches is closed and the other resistor switch is open at the same time, and a symmetric charging test mode in which both of the resistor switches are either closed at the same time or open at the same time, and
  wherein the pair of charging lines opens into a charging station-side charging plug that has a connection sensor that is configured to detect connection of the charging station-side charging plug to a vehicle-side charging socket, wherein the test mode controller activates only the charging test mode when connection is reported by the connection sensor.

4. A method for operating a traction battery charging station for charging a traction battery of a motor vehicle having an electric traction motor, said traction battery charging station including (a) a power/voltage converter that is configured to feed an electrical DC voltage charging power into a pair of two charging lines during a charging operation, (b) a charging controller, and (c) an insulation monitor having a test mode controller and two electrical measuring resistors that are each connected to a respective one of the two charging lines and are configured to be connected to protective earth via a respective resistor switch, wherein the insulation monitor is configured to monitor the electrical insulation of the pair of charging lines with respect to the protective earth during non-charging and during charging of the traction battery, said method comprising:
  wherein, when the vehicle is electrically connected to the charging station via the two charging lines and the charging station is not charging the vehicle, the test mode controller performs:
    (i) a non-symmetric non-restricted non-charging test mode in which one of the resistor switches is closed and the other resistor switch is open at the same time, and
    (ii) a symmetric charging test mode in which both of the resistor switches are either closed at the same time or open at the same time,
  wherein, when the vehicle is electrically connected to the charging station via the two charging lines and the charging station is charging the vehicle, the test mode controller performs the symmetric charging test mode without performing the non-symmetric non-restricted non-charging test mode.

\* \* \* \* \*